(12) United States Patent
Meek et al.

(10) Patent No.: US 6,864,890 B2
(45) Date of Patent: Mar. 8, 2005

(54) METHOD OF BUILDING AND UPDATING AN ANISOTROPIC VELOCITY MODEL FOR DEPTH IMAGING OF SEISMIC DATA

(75) Inventors: Robert A. Meek, Ponca City, OK (US); Phil D. Anno, Ponca City, OK (US)

(73) Assignee: Comoco Phillips Company, Houston, TX (US)

( * ) Notice: Subject to any disclaimer, the term of this patent is extended or adjusted under 35 U.S.C. 154(b) by 130 days.

(21) Appl. No.: 10/228,450

(22) Filed: Aug. 27, 2002

(65) Prior Publication Data

US 2004/0041815 A1 Mar. 4, 2004

(51) Int. Cl.⁷ .............................................. G06T 11/20
(52) U.S. Cl. .................... 345/440; 345/582; 345/440.1; 345/441; 345/442
(58) Field of Search ................................ 345/582, 422, 345/440, 440.1, 441

(56) References Cited

U.S. PATENT DOCUMENTS

| | | | |
|---|---|---|---|
| 2,732,906 A | 1/1956 | Mayne ........................ | 181/0.5 |
| 3,217,828 A | 11/1965 | Mendenhall et al. ........ | 181/0.5 |
| 4,797,861 A | 1/1989 | Beasley ....................... | 367/50 |
| 4,964,103 A | 10/1990 | Johnson ....................... | 367/53 |
| 5,677,893 A | 10/1997 | de Hoop et al. .............. | 367/50 |
| 5,852,588 A | 12/1998 | de Hoop et al. .............. | 367/38 |
| 6,002,642 A | * 12/1999 | Krebs .......................... | 367/73 |

OTHER PUBLICATIONS

Tariq Alkhalifah et al.; *Velocity analysis for transversely isotropic media*, Geophysics, vol. 60, No. 5, Sep.–Oct. 1995, pp. 1550–1566, 21 Figures.

Vladimir Grechka et al.; *Feasibility of nonhyperbolic moveout inversion in transversely isotropic media*, Geophysic, vol. 63, No. 3, May–Jun. 1998, pp. 957–969, 9 Figures, 1 Table.

Hengchang Dai et al.; *Anisotropic migration and model building for 4C seimic data: A case study from Alba*, 2001 SEG 71st International Meeting, pp. 795–798.

Arcangelo G. Sena et al.; *Kirchhoff migration and velocity analysis for converted and nonconverted waves in anisotropic media*, Geophysics, vol. 58, No. 2, Feb. 1993, pp. 265–276, 11 Figures, 3 Tables.

Samuel H. Gray et al.; *Kirchhoff migration using eikonal traveltimes*, Geophysics, vol. 59, No. 5, May 1994, pp. 810–817, 7 Figures.

Leon Thomsen; *Weak elastic anisotropy*, Geophysics, vol. 51, No. 10, Oct. 1986, pp. 1954–1966, 5 Figures, 1 Table.

Vladimir Grechka et al.; *Feasibility of nonhyperbolic moveout inversion in transversely isotropic media*, Geophysics, vol. 63, No. 3, May–Jun. 1998), pp. 957–969, 9 Figures, 1 Table.

Philippe Berthet et al.; *Anisotropic Prestack Depth Migration: an Offshore Africa Case Study*, Anisotropy 2000: Fractures, converted waves and case studies the Society of Exploration Geophysicists, pp. 1–7, 6 Figures.

G. W. Postma; *Wave propagation in a Stratified Medium*, Geophysics, vol. XX, No. 4, Oct., 1955, pp. 780–806, 13 Figures.

\* cited by examiner

*Primary Examiner*—Matthew C. Bella
*Assistant Examiner*—Tam Tran
(74) *Attorney, Agent, or Firm*—Madan, Mossman & Sriram, P.C.

(57) ABSTRACT

Conventional migration of short offset seismic data is performed. An interval velocity is obtained using, for example, check shots. An initial model of effective anellipticity parameter as a function of depth is obtained by flattening long offsets within a common image point. From these, interval anellipticity and horizontal velocity are obtained as a function of time. These initial models are used for anisotropic imaging. Any remaining residuals are used to update the interval anellipticity model and the process of migration is repeated until satisfactory results are obtained.

12 Claims, 9 Drawing Sheets

(4 of 9 Drawing Sheet(s) Filed in Color)

METHOD OF BUILDING AND UPDATING AN ANISOTROPIC VELOCITY MODEL FOR DEPTH IMAGING OF SEISMIC DATA

BACKGROUND OF THE INVENTION

1. Field of the Invention

The present invention is a method of obtaining an anisotropic velocity model for proper depth imaging of seismic data.

2. Related Prior Art

The search for subsurface hydrocarbon deposits typically involves a multifaceted sequence of data acquisition, analysis, and interpretation procedures. The data acquisition phase involves use of an energy source to generate signals which propagate into the earth and reflect from various subsurface geologic structures. The reflected signals are recorded by a multitude of receivers on or near the surface of the earth, or in an overlying body of water. The received signals, which are often referred to as seismic traces, consist of amplitudes of acoustic energy which vary as a function of time, receiver position, and source position and, most importantly, vary as a function of the physical properties of the structures from which the signals reflect. The data analyst uses these traces along with a geophysical model to develop an image of the subsurface geologic structures.

Common Mid Point (CMP) stacking, also sometimes referred to as Common Depth Point or Common Reflection Point, CDP or CRP respectively) of seismic field data is well known. See for example U.S. Pat. No. 3,217,828 to Mendenhall et al, and U.S. Pat. No. 2,732,906 to Mayne, which are incorporated herein by reference as a teaching of the CMP technique. The U.S. Pat. No. 3,217,828 teaches two-dimensional (2-D) data processing where dipping earth layers are projected into a two-dimensional plane, perpendicular to the surface of the earth, along a designated line of profile.

Seismic data migration typically uses diffraction traveltimes from subsurface imaging points to the source and receiver locations to produce an image of the subsurface reflectors. The diffraction traveltimes are the seismic signal propagation times along raypaths from each imaging point to the source and receiver locations. The propagation times, which are usually plotted as diffraction traveltime curves, are used after appropriate preprocessing of the raw seismic data to generate an estimate of the correct location of the reflector.

Figure 1:
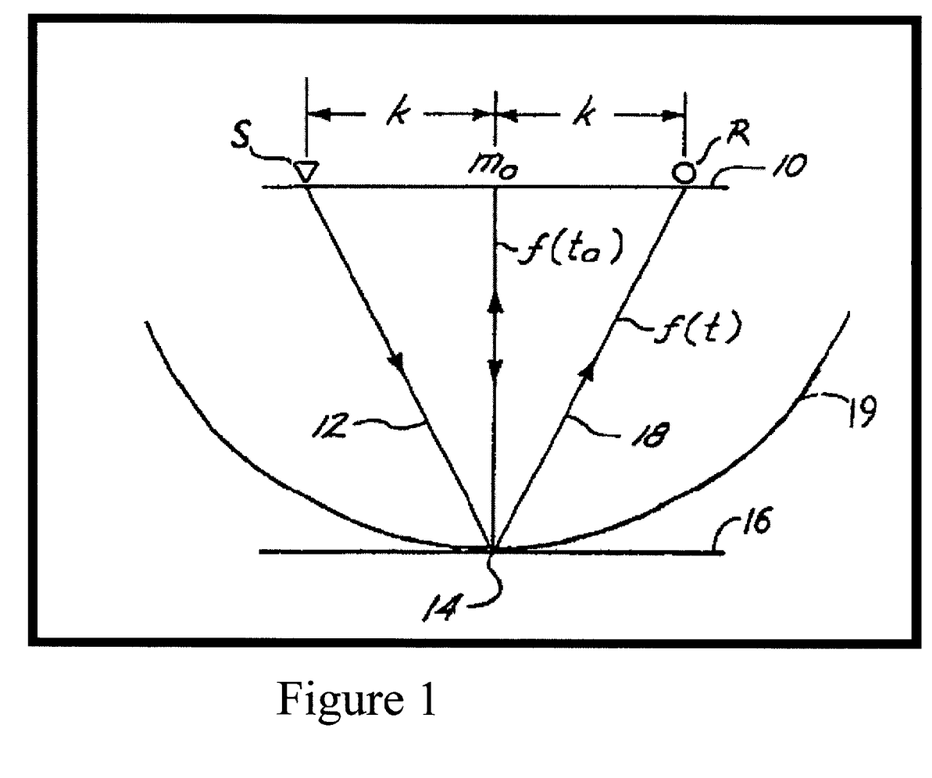
FIG. 1 illustrates the basic geometry used in seismic prospecting of subsurface formations.

The basic concepts of migration are discussed next with reference to FIG. 1. A portion of the surface of the earth is shown at 10. A sound source S may be offset from a receiver R by an offset distance 2 k with a midpoint at $m_0$. A wavefield generated at S, may travel along ray path 12 to a reflecting point 14 on reflector 16 and reflected back along ray path 18 to receiver R. The amplitude of the wave field as a function of time, f(t), may be recorded on a time-scale recording, hereinafter referred to as trace. Seismic data are generally quantized as digital samples. In the processes next to be discussed, each sample of a seismic trace may be operated upon individually. In the interest of brevity, use of the collective term "seismic trace" in conjunction with a process means that every data sample of that trace has been individually subjected to the named process.

Because of the offset distance 2 k, the arrival time t of a particular wavelet along path S-14-R is greater than the travel time $t_0$ of a wavelet that might have traveled along a direct path $m_0$-14-$m_0$. The time difference is termed normal moveout (NMO). The quantity f(t) may be corrected for NMO by the relation $$t_0^2 = t_k^2 - (4k^2/V^2) \tag{1}$$

where V represents the NMO velocity of the medium through which the wavelet traveled. The above relation is a small-offset approximation. It should be observed that for zero offset k and constant velocity V the reflection points for $f(t_0)$ such as 14 lie along a semicircle such as 19 centered about $m_0$. Wavelet amplitude varies according to the inverse square law due to geometric spreading.

Figure 2:
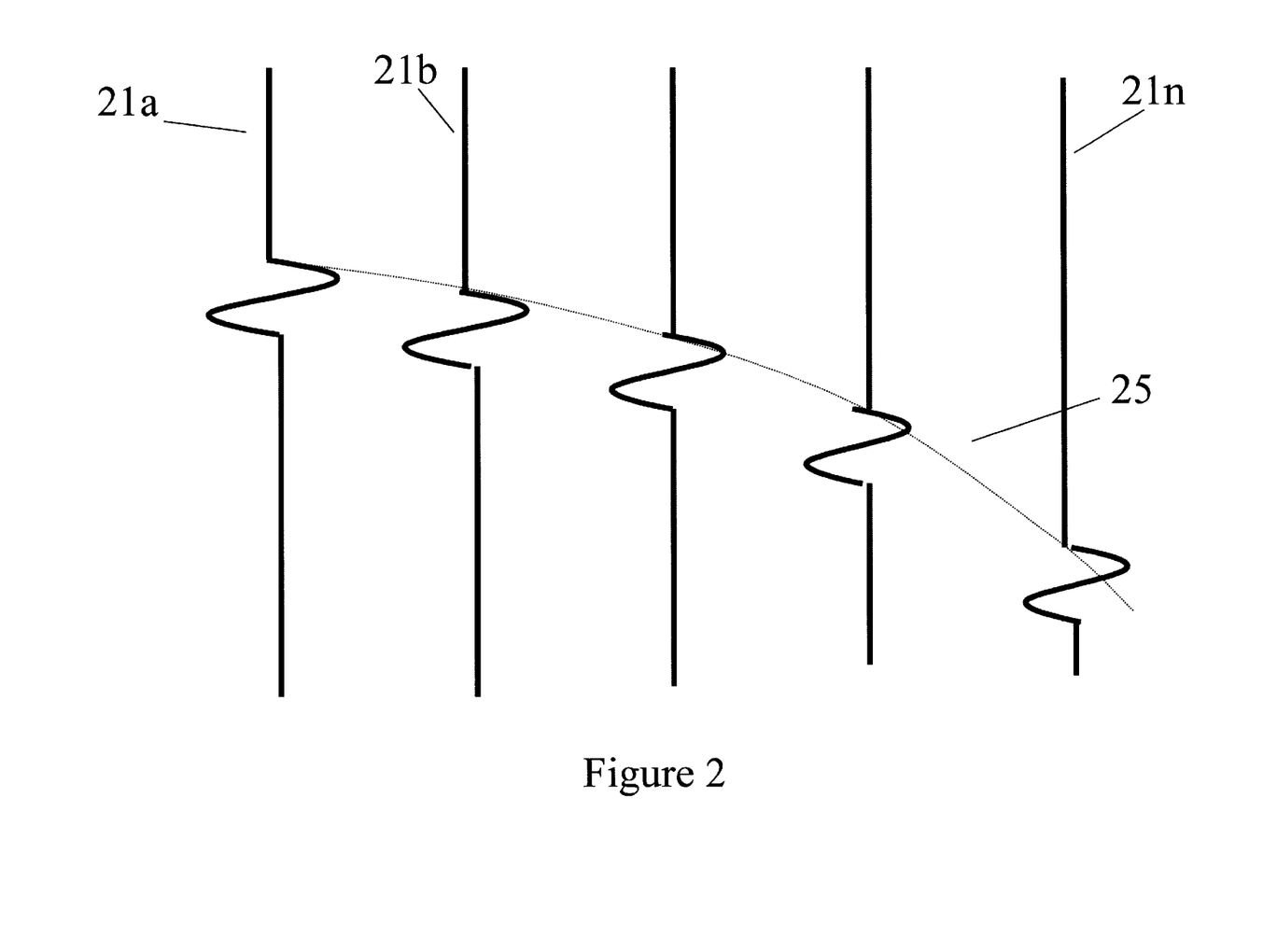
FIG. 2 is an illustration of seismic traces.

The hyperbolic time-distance relationship given by eq. (1) is illustrated in FIG. 2 where a plurality of traces 21a, 21b, . . . 21n are shown with a reflection event depicted by the curve 25. The general process of migration involves moving portions of seismic data along a diffraction curve such as 25 to an output location and summing the contributions from a large portion of the seismic section. The reflector in the subsurface may be viewed as being made up of a plurality of diffraction points. At the correct position of a diffractor, contributions from the plurality of migrated traces will sum coherently whereas at other locations, the summation will be incoherent and have close to zero amplitude; in this fashion an image of the subsurface can be reconstructed.

The migration process may be implemented in the time domain by the summation process or it may be implemented in the frequency domain. Such methods would be known to those versed in the art.

There is a vast array of literature indicating that the velocity of propagation of seismic waves in the subsurface is anisotropic, i.e., it depends upon the direction of propagation. There are numerous causes of such anisotropy. Backus showed that layering of isotropic materials having different shear modulii and with a layer thickness much shorter than the wavelength of seismic waves produces a transverse isotropy with a vertical symmetry axis (referred to hereafter VTI). In addition, shales exhibit transverse isotropy in their elastic properties even at very short seismic wavelengths. This has been attributed to intrinsic anisotropy. The cause of VTI is not pertinent to the present invention in that the present invention is a method for properly migrating seismic data in the presence of VTI regardless of the origin of the VTI.

A TI medium is characterized by five elastic modulii. These may be denoted by the tensor $$\begin{bmatrix} c_{11} & c_{11}-2c_{66} & c_{13} & 0 & 0 & 0 \\ c_{11}-2c_{66} & c_{11} & c_{13} & 0 & 0 & 0 \\ c_{13} & c_{13} & c_{33} & 0 & 0 & 0 \\ 0 & 0 & 0 & c_{44} & 0 & 0 \\ 0 & 0 & 0 & 0 & c_{44} & 0 \\ 0 & 0 & 0 & 0 & 0 & c_{66} \end{bmatrix} \tag{2}$$

where the modulus $c_{11}$ defines the velocity of a horizontally propagating P-wave, $c_{33}$ defines the velocity of a vertically propagating P-wave, $c_{44}$ defines the velocity of a vertically propagating shear wave, and $c_{66}$ defines the velocity of a horizontally propagating S-wave (shear wave) with horizontal polarization. These four parameters are determinable by making suitable measurements of P- and S-waves parallel to and perpendicular to the symmetry axis. The velocity is given by the square root of the ratio of the elastic modulus to the density. However, the parameter $c_{13}$ is not readily determinable by measurements parallel to and perpendicular to the symmetry axis. Determination of $c_{13}$ requires a measurement off the symmetry axis. It also turns out that this parameter $c_{13}$ is of particular importance in reflection seismic prospecting.

Thomsen defined several parameters characterizing a VTI medium. One of these is the quantity $\epsilon$ defined by $$\varepsilon = \frac{c_{11} - c_{33}}{2c_{33}} \qquad (3)$$

This parameter is directly related to the difference between the horizontal and vertical P-wave velocities. Another parameter defined by Thomsen is the quantity $\delta$ defined as $$\delta = \frac{(c_{13} + c_{44})^2 - (c_{33} - c_{44})^2}{2c_{33}(c_{33} - c_{44})} \qquad (4)$$

Based on the results derived by Thomsen, for a horizontal reflector in a TI medium, eq.(1) is valid for small offsets with $$t_n = z/V_z \qquad (5)$$

and $$V_{nmo} = V = V_z\sqrt{1+2\delta} \qquad (6)$$

where z is the depth of the reflector, $V_z$ is the vertical velocity. The normal moveout velocity is thus dependent upon the parameter $\delta$ and the vertical velocity.

Alkhalifah & Tsvankin showed that the P-wave reflection moveout at large offsets is largely controlled by just two parameters. One is the $V_{nmo}$ given by eq. (6) and the second is a parameter $\eta$ defined by $$\eta = \frac{1}{2}\left(\frac{V_{hor}^2}{V_{nmo}^2} - 1\right) = \frac{\varepsilon - \delta}{1 + 2\delta} \qquad (7)$$

where $$V_{hor} = V_{nmo}\sqrt{1+2\eta} \qquad (8)$$

with the moveout equation given by $$t^2(x) = t_o^2 + \frac{x^2}{V_{nmo}^2} - \frac{2\eta x^4}{V_{nmo}^2[t_0^2 V_{nmo}^2 + (1+2\eta)x^2]} \qquad (9)$$

$$= t_0^2 + \frac{x^2}{V_{nmo}^2} - \frac{(V_{hor}^2 - V_{nmo}^2)x^4}{V_{nmo}^2(t^2 V_{nmo}^4 + V_{ho}^2 x^2)}$$

and x=2 k in eq. (1) and FIG. 1.

As would be known to those versed in the art, conventional velocity analysis of seismic reflection data is based on use of semblance scans along hyperbolic moveout curves. Gretchka & Tsvankin disclose a method for inversion of seismic data using semblance scans along non-hyperbolic moveout curves using a modified version of eq. (9). The modification is based on empirical observations for simulated results wherein an offset range of x/z≅2 was used. The modified equation used by Gretchka & Tsvankin is $$t^2(x) = t_0^2 + \frac{x^2}{V_{nmo}^2} - \frac{(V_{hor}^2 - V_{nmo}^2)x^4}{V_{nmo}^2(t_0^2 V_{nmo}^4 + CV_{hor}^2 x^2)} \qquad (10)$$

the modification being the empirical constant C in the denominator of the last term on the right hand side of eq. (10).

Accuracy of the subsurface image is of great importance in seismic prospecting: interpretation of the structure and lithology of the subsurface is preferably done on depth migrated sections. The accuracy of the image is closely related to the velocity model. Gretchka & Tsvankin do not address the interaction between iterative changes in the velocity model and subsequent changes in the accuracy of the depth image.

It is therefore desirable to have a method for determination and iterative updating of subsurface velocities in anisotropic earth formations. Such a method should preferably be efficient in terms of computer resources and should also preferably provide more accurate images of the earth formations. The present invention satisfies this need.

SUMMARY OF THE INVENTION

The present invention is a method of seismic prospecting over a region of interest having velocity anisotropy. Conventionally migrated seismic data are obtained using an isotropic velocity model wherein short offsets within a common image point gather have substantially flat moveouts. A model of vertical interval velocity as a function of depth is obtained using checkshots, VSPs, sonic logs, or geologic information. An initial model of an effective anellipticity parameter as a function of depth over the region of interest is obtained. Using the conventionally migrated seismic data, the model of vertical interval velocity as a function of depth and the anellipticity parameter as a function of depth, an anisotropic migrated image of the subsurface is obtained. By reviewing long offsets within common image points of the anisotropic migrated image, a residual anellipticity parameter is determined, the subsurface model is updated, and the migration is repeated. The anisotropic migrated image is preferably obtained using Kirchoff migration. The conventionally migrated seismic data may be obtained by Kirchoff migration, finite difference, or frequency domain methods.

Determination of the effective anellipticity parameter further comprises using semblance processing with non-hyperbolic moveout.

The Kirchoff migration is preferably carried out after a depth-to-time conversion of the effective anellipticity model. That is, following a layer stripping, models of the horizontal interval velocity and the anellipticity parameter are obtained as a function of time: this is followed by a conversion back to depth prior to the anisotropic imaging.

BRIEF DESCRIPTION OF THE DRAWINGS

The file of this patent contains at least one drawing executed in color: Copies of this patent with color drawing(s) will be provided by the Patent and Trademark Office upon request and payment of the necessary fee. The present invention is best understood with reference to the following figures in which like numerals refer to like elements and in which.

DETAILED DESCRIPTION OF THE INVENTION

Figure 3:
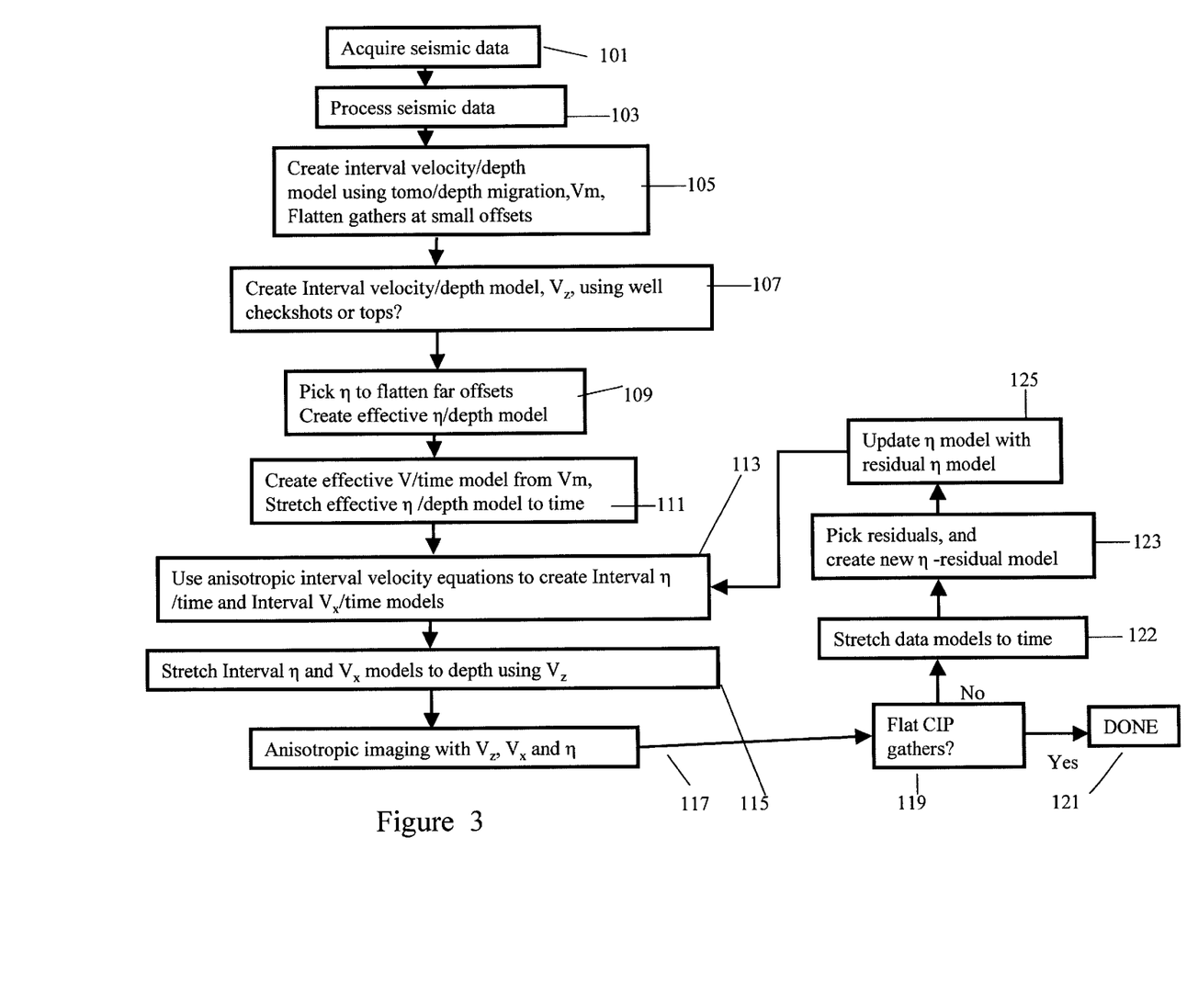
FIG. 3 is a flow chart illustrating some of the steps of the present invention.
Figure 4:
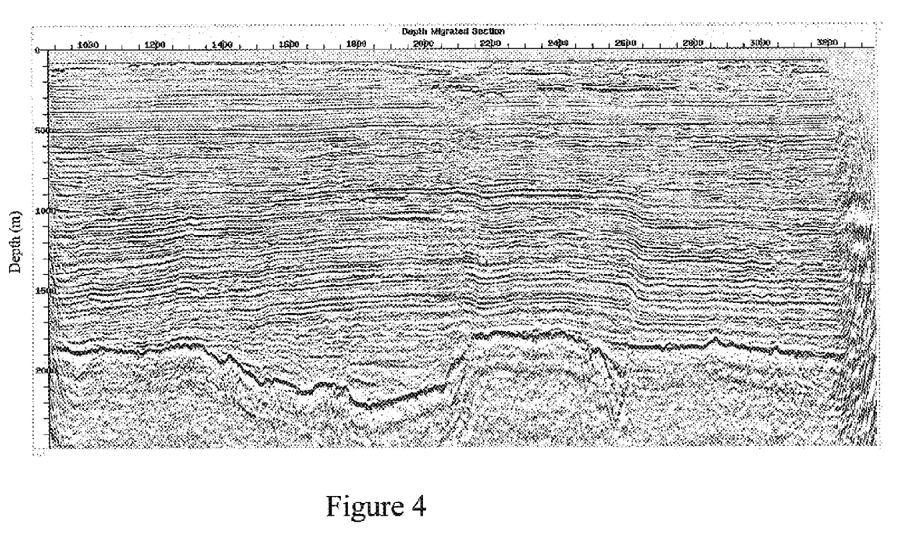
FIG. 4 is an example of a seismic section.

Turning now to FIG. 3, a flow chart that includes the preferred embodiment of the present invention is shown. Anisotropic depth migration requires three independent models: a vertical velocity model $V_z$, a horizontal velocity model $V_x$, and an anisotropy parameter model $\eta$ satisfy this requirement. Seismic data over the region of interest are acquired or obtained 101 using any one of numerous well-known seismic exploration techniques. This gives seismic traces such as those depicted in FIG. 2 wherein one or more seismic reflections (or diffractions) appear on a plurality of seismic traces. Each seismic trace is associated with a source position and a receiver position. Shown in FIG. 4 is an example of a seismic section. It is to be noted that in actual practice, color displays are used for displays of seismic sections and diagnostics: this greatly increases the ease with which desired features can be seen. Black and white displays, as shown in this document, are usually adequate, but color displays are preferable.

Still referring to FIG. 3, the data acquired at 101 are then subjected to routine seismic processing in well-known ways. The following techniques exemplify such processing. As part of the routine seismic processing, the data may have the source signature removed, frequency filtered, resampled, and then sorted to common midpoint gathers. Next the gathers might be subjected to multichannel filters to remove noise and multiples. This may be done for all seismograms that were recorded.

Next, an isotropic velocity model ($V_m$) is built and the processed seismograms are prestack depth migrated yielding a depth migration dataset 105. Prestack depth migration uses a velocity model of the subsurface to reposition the seismograms that are recorded into time to proper locations in depth. This initial velocity model may be based upon analysis of well logs, stacking velocities, or tomographic velocities. The geophysicist can then interpret the depth data to locate hydrocarbons or similar valuable minerals. There are several known ways to depth migrate the data including Kirchhoff summation, finite difference methods, or frequency finite difference methods. All rely on an accurate velocity model. In a preferred embodiment of the invention, a Kirchhoff summation is used. Given a velocity model a traveltime is calculated from a source position to a position in the subsurface known as a common image point. Another traveltime is calculated from the receiver position to the common image point. The amplitude from the seismogram corresponding to this source-receiver combination at the resulting time is summed into this common image point. Usually a similar offset is summed into one depth dataset.

Figure 5:
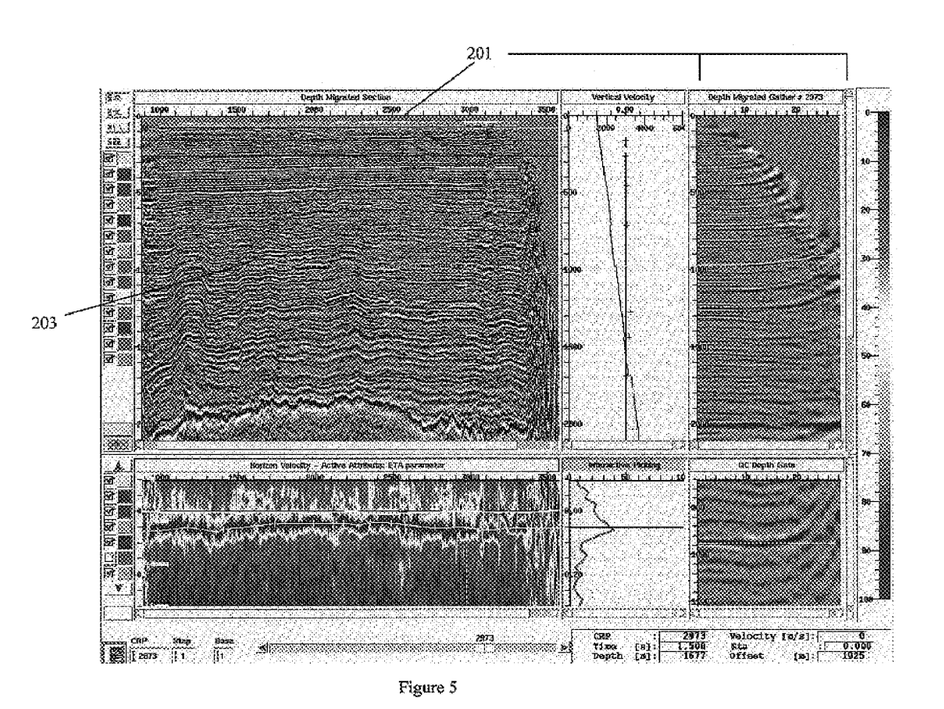
FIG. 5 is an exemplary initial display showing a conventionally migrated seismic section along with diagnostic displays of a common image point gather and an effective anellipticity parameter.

The dataset is then sorted by position on the earth and offset resulting in a common image point gather (CIP gather). An example of a CIP gather is shown in the top right hand panel of FIG. 5. The source-receiver offset increases from left to right. The location corresponding to CIP panel 201 is also indicated on the upper left hand panel. The bottom right panel of FIG. 5 shows an enlarged portion of the display in the top right panel These CIP gathers are then analyzed. If the velocity model is correct the CIP gathers will be flat and the gathers can be stacked. If the CIP gathers are not flat the velocity model is refined using well-known techniques such as vertical updating or ray tomography. The data is then prestack depth migrated and the process repeated until the CIP gathers are flat. In an isotropic medium such as sandstone the horizontal and vertical velocities are the same. In VTI media such as shale (and in finely laminated sequences of isotropic materials) the horizontal velocities are faster than the vertical velocities. Using this isotropic velocity model the seismic traces at small offsets in the CIP gathers will be flat using this technique, but the far offsets which result from energy passing through earth formations at angles closer to horizontal will be influenced more by the horizontal velocity. Usually, the far offsets in the CIP will not be flat in the presence of anisotropy. It can be seen in FIG. 5, that the near offsets in the CIP are flat, but the far offsets are not. For convenience, data obtained at this point in the processing (i.e., after 105) is referred to as conventionally migrated seismic data. In addition, data at the output of 103 is referred to as conventionally processed seismic data.

Still referring to FIG. 3, a vertical interval velocity $V_z$ model as a function of depth is created 107. This model represents interval velocity in the vertical direction as a function of depth. This velocity information can be obtained from well information such as checkshot surveys, sonic logs, or known tops of geologic units in the well. Data may also be obtained from a Vertical Seismic Profile (VSP). Calculation from well data of $V_z$ as a function of depth uses methods well-known in prior art. It is to be pointed out that Gretchka & Tsvankin do not discuss obtaining a model of the vertical interval velocity as a function of depth.

Next, an $\eta$ model is created 109 by analyzing and flattening the far offsets in the CIP gathers from 105. A semblance analysis for $\eta$ is calculated on the CIP gathers using the moveout equation:

$$t^2 = t_0^2 + \frac{x^2}{V_{m,eff}^2}\left[1 - \kappa(x, t_0; V_{m,eff}, \eta_{eff})\right] \quad (11)$$

where $$\kappa \equiv \frac{2\eta_{eff} x^2}{t_0^2 V_m^2 + (1 + 2\eta_{eff})x^2} \quad (12)$$

where C is the same constant as in eq. (10), and t=CIP travel time $t_0$=two way vertical travel time x=offset distance $V_{m,eff}$=effective velocity from short-offset CIP analysis (calculated from 105)

$\eta_{eff}$=effective anisotropy (anellipticity) coefficient.

The maximum value of semblance is picked. This gives a model of the effective value of $\eta_{eff}$ as a function of time that is converted to a model of the effective velocity of $\eta_{eff}$ as a function of depth, using the $V_z$ model as a function of depth from 107.

An example of η analysis is shown in the bottom left panel of FIG. 5. This corresponds to a region close to the horizon 203. If there is no anisotropy in the area $\eta_{eff}$ will be zero. The semblance curve is picked to yield the best $\eta_{eff}$ value that flattens the CIP gather. The $\eta_{eff}$ function may vary laterally and vertically. This analysis is done for several layers in the seismic survey and a model $\eta_{eff}$ is produced.

Proceeding to 111, an effective velocity model $V_{m,eff}$ is created in time from the isotropic $V_m$—depth model created in 105. Using the equation:

$$V_{m,eff}^2(t_0) = \frac{\int_0^{t_0} d\tau V_m^2(\tau)}{\int_0^{t_0} d\tau} \quad (13)$$

where $V_m(t_0)$=short-offset interval velocity. The $\eta_{eff}$—depth model from 109 is also stretched to time using the isotropic velocities calculated in 105.

Next, an interval η—time model and an interval horizontal velocity $V_x$—time model is created 113 using equations from Grechka and Tsvankin:

$$V_{x,eff}(t_0) = V_{m,eff}(t_0)\sqrt{1+2\eta_{eff(t_0)}} \quad (14)$$

$$f(t_0) = V_{m,eff}^2(t_0)[4V_{x,eff}^2(t_0) - 3V_{m,eff}^2(t_0)] \quad (15)$$

$$\eta(t_0) = \frac{1}{8}\left[\frac{t_0 f(t_0) - (t_0 - \delta t_0)f(t_0 - \delta t_0)}{V_m^4(t_0)\delta t_0} - 1\right] \quad (16)$$

$$V_x(t_0) = \frac{1}{2}V_m(t_0)\sqrt{\frac{t_0 f(t_0) - (t_0 - \delta t_0)f(t_0 - \delta t_0)}{V_m^4(t_0)\delta t_0} + 3} \quad (17)$$

or equivalently $$V_x(t_0) = V_m(t_0)\sqrt{1+2\eta(t_0)} \quad (18)$$

where $V_{x,eff}(t_0)$=effective horizontal velocity $V_x(t_0)$=interval horizontal velocity $\eta(t_0)$=interval anisotropy (anellipticity) parameter $\delta t_0$=time sample rate of model.

It should be pointed out that portions of the invention disclosed hereafter are not part of the teachings of Grechka and Tsvankin.

Figure 6A:
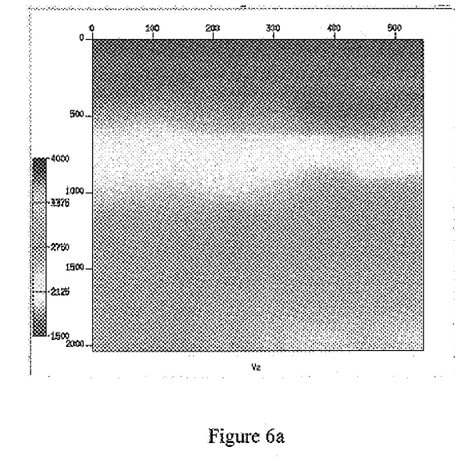
FIGS. 6a, 6b and 6c show displays of initial models of the vertical velocity, horizontal velocity and anellipticity parameter as a function of depth.
Figure 6B:
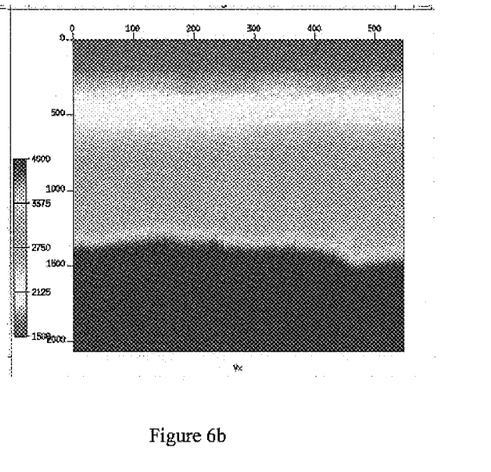
Figure 6C:
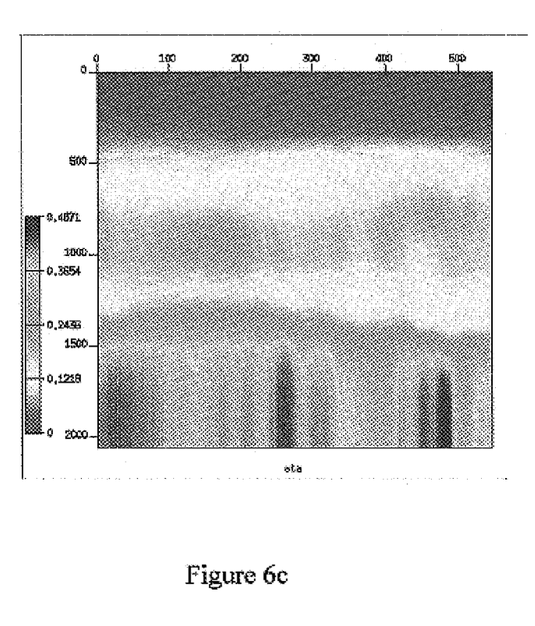

Proceeding to 115 the interval η—time model and the interval $V_x$—time model are stretched to true depth using the $V_z$ model created in 107. The models after this are now in the same depth domain. FIGS. 6a–6c show examples of the three models. FIG. 6a is a display of the vertical velocity $V_z$ as a function of depth (vertical axis) and horizontal location along the seismic line; FIG. 6b is a similar display of the horizontal velocity while FIG. 6c is a display of the anellipticity parameter η. It can be seen that in the shallow portion of the model (which is dominated by shale) the horizontal velocity is faster than the vertical velocity.

Next, the three models $V_z$, $V_x$, and η are used in depth migration 117. In a preferred embodiment of the invention, Kirchhoff migration is used, though other methods of migration could also be used. Pre-stack migration techniques are discussed, for example in Johnson (U.S. Pat. No. 4,964,103) having the same assignee as the present application and the contents of which are fully incorporated herein by reference. Kirchoff migration is discussed, for example in Gray & May and in Sena & Toksoz. In the present invention, the depth imaging travel times are calculated using all three models ($V_z$, $V_x$, and η). The travel time calculation used in this method is an eikonal type, but raytracing and other methods could also be used. The Kirchhoff migration results in a set of CIP gathers similar to those in 105.

The CIP gathers from 117 are then analyzed 119 by semblance calculation as in 109. The seismic traces in the CIP gather will be flat at small offsets. The far offsets in the gathers are flat if the η model is correct. If the gathers are flat the method proceeds to 121 where the CIP gathers are then summed and the imaging complete. If the gathers are not flat the method proceeds to 122. At this point, it is evident that the model is incorrect. The data and models are stretched back to time 122. The semblances are re-computed and a residual η—time model is created.

At 125 the η anisotropy model is then updated with the residual η—time model using one of the following two procedures. In one embodiment, use is made of the following equations:

$$\eta_{eff,new}(t_0) = \frac{\kappa(\eta_{eff,old}) - r}{1 - (\kappa(\eta_{eff,old}) - r)} \frac{V_{m,eff}^2(t_0)t_h^2(x_{ref})}{2x_{ref}^2} \quad (19)$$

$$t_h^2 \equiv t_0^2 + \frac{x^2}{V_{m,eff}^2(t_0)} \quad (20)$$

$$r(\Delta t; x) \equiv \Delta t(\Delta t + 2t_0)\frac{V_{m,eff}^2(t_0)}{x^2} \quad (21)$$

where Δt is measured directly from data, as shown in FIG. 5, and updated $\eta_{eff,new}$ is determined from eqs. (19–21). In eqs. (19–21)

Figure 7:
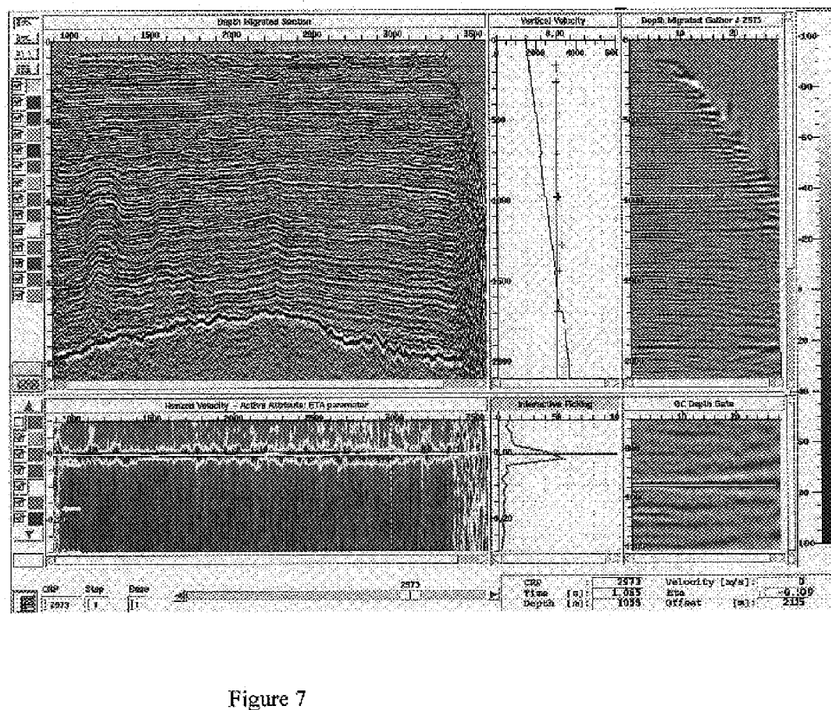
FIG. 7 shows the final display of the seismic section, the common image point gather and the effective residual anellipticity parameter.

$\eta_{eff,new}$=updated effective anisotropy parameter $\eta_{eff,old}$=previous effective anisotropy parameter $x_{ref}$=distance from the source to a reference offset Alternatively, eq. (22) is fit directly to data to estimate an approximate $\eta_{eff,res}$ and $\eta_{eff,new}$ from eq. (23).

$$t_{res}^2(x) \approx t_0^2 - 2\eta_{eff,res}\frac{x^4}{t_0^2 V_{m,eff}^4} \quad (22)$$

$$\eta_{eff,res} = \eta_{eff,new} - \eta_{eff,old} \quad (23)$$

where $\eta_{eff,res}$=residual effective anisotropy parameter x=distance from the source to each receiver The method then proceeds to 113 where the interval η—time model and $V_x$—time models are calculated. The seismic data are anisotropic depth migrated and the CIP gathers analyzed. Once the gathers are flat the method proceeds to 121 where the CIP gathers are stacked and the imaging is complete. A properly migrated CIP gather is shown in FIG. 7. This is the same CIP gather as shown in FIG. 5 with only the isotropic velocity model. Comparison of the upper and lower right panels in FIG. 7 with the corresponding panels in FIG. 5 shows considerable improvement in the CIP gather. The semblance panel in the lower left corner of FIG. 7 indicates little or no residual correction to the η model is required after this iteration. By properly representing the earth and building exact anisotropic velocity models the data are properly positioned.

Figure 8A:
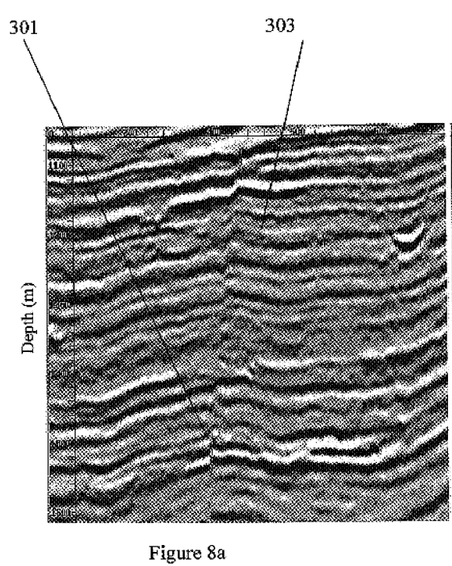
FIG. 8 shows a comparison of conventional migration with a migration using the method of the present invention.
Figure 8B:
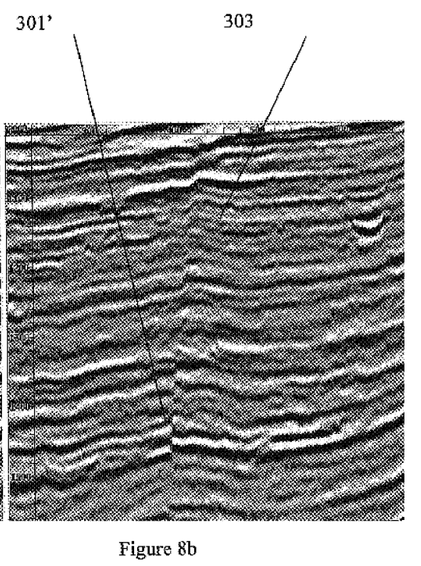

A completed seismic anisotropic depth migrated image is shown in FIG. 8b with the corresponding isotropic depth migrated image FIG. 8a. Note that the reflections and fault are sharper in the anisotropic depth image. The seismic image thus produced yields a more exact representation of the earth's subsurface, tying wells better, with structures such as faults and channels in their proper position. Even to the untrained eye, the difference in resolution of the major fault (compare 301 with 301') should be apparent. In addition, the shallow channel 303' in the anisotropic migration appears to be better defined than the corresponding image 303 in the isotropic migration. Other differences are seen by the trained seismic interpreter.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of processing of seismic data over a region of interest comprising:
   (a) obtaining a depth migration interval velocity model for conventionally migrated seismic data, said conventionally migrated seismic data having substantially flat moveout for short offsets within a common image point;
   (b) obtaining a model of vertical interval velocity as a function of depth over the region of interest;
   (c) determining an initial model of an effective anellipticity parameter as a function of depth over the region of interest;
   (d) obtaining a migrated image of the region of interest from said model of migration interval velocity as a function of depth, said model of vertical interval velocity as a function of depth, and from an initial model of an interval anellipticity parameter as a function of depth; and
   (e) updating said model of interval anellipticity parameter as a function of depth.

2. The method of claim 1 wherein obtaining said conventionally migrated seismic data further comprises migrating conventionally processed seismic data.

3. The method of claim 2 wherein said conventionally processed seismic data is obtained from one of (i) conventional processing of acquired seismic data, and, (ii) conventional processing of obtained seismic data.

4. The method of claim 2 wherein migrating said conventionally processed seismic data further comprises using at least one of (i) Kirchhoff summation, (ii) finite difference methods, and, (iii) frequency finite difference methods, for short-offset data.

5. The method of claim 1 wherein obtaining said model of vertical interval velocity as a function of depth further comprises using data from at least one of (i) a checkshot survey, (ii) sonic logs, (iii) known tops of geologic units in a well, and, (iv) a VSP survey in a well.

6. The method of claim 1 wherein determining said model of an effective anellipticity parameter further comprises using a semblance processing including long offsets within a common image point.

7. The method of claim 1 wherein obtaining said migrated image further comprises:
   (i) creating a model of effective migration velocity as a function of time from (a);
   (ii) converting said initial model of the effective anellipticity parameter as a function of depth to a model of the effective anellipticity parameter as a function of time; and
   (iii) determining a model of horizontal velocity as a function of time and said interval anellipticity parameter as a function of time from (i) and (ii) respectively.

8. The method of claim 7 further comprising:
   (iv) converting said model of horizontal velocity as a function of time and said model of interval anellipticity parameter as a function of time to functions of depth; and
   (v) performing a Kirchoff migration using said models of vertical velocity, horizontal velocity and anellipticity parameter as a function of depth.

9. The method of claim 1 further comprising displaying and reviewing long offset common image point (CIP) gathers from said migrated image.

10. The method of claim 8 further comprising displaying and reviewing long offset common image point gathers from said Kirchoff migration.

11. The method of claim 10 wherein, if said long offset gathers are not flat, creating a residual anellipticity parameter model.

12. The method of claim 11 further comprising:
   (A) using said residual anellipticity parameter model for updating model of the effective anellipticity parameter as a function of time in claim 7, step (iv); and
   (B) repeating the steps of claims 8, 10 and 11.

* * * * *